Oct. 5, 1971  TAKASHI FUNAKI  3,609,956
NUMERICALLY INDICATING TIMEKEEPER ATTACHED
WITH TIMER AND/OR ALARM
Filed July 28, 1969                               5 Sheets-Sheet 1

INVENTOR
TAKASHI FUNAKI

BY McGlew and Toren
ATTORNEYS

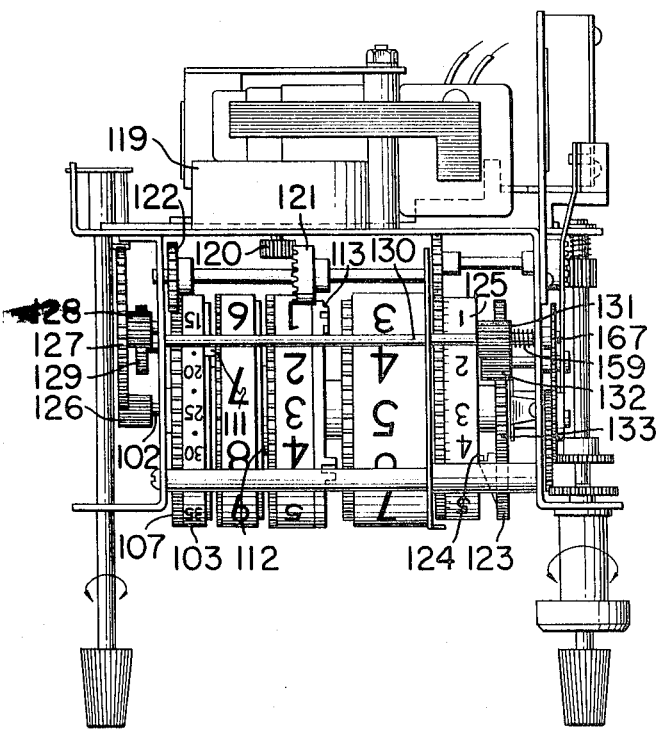

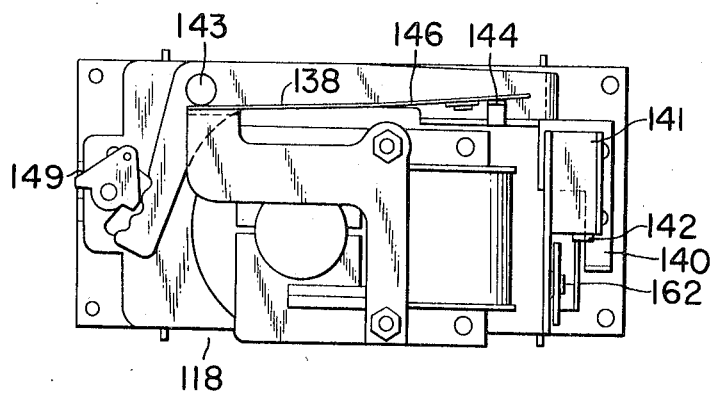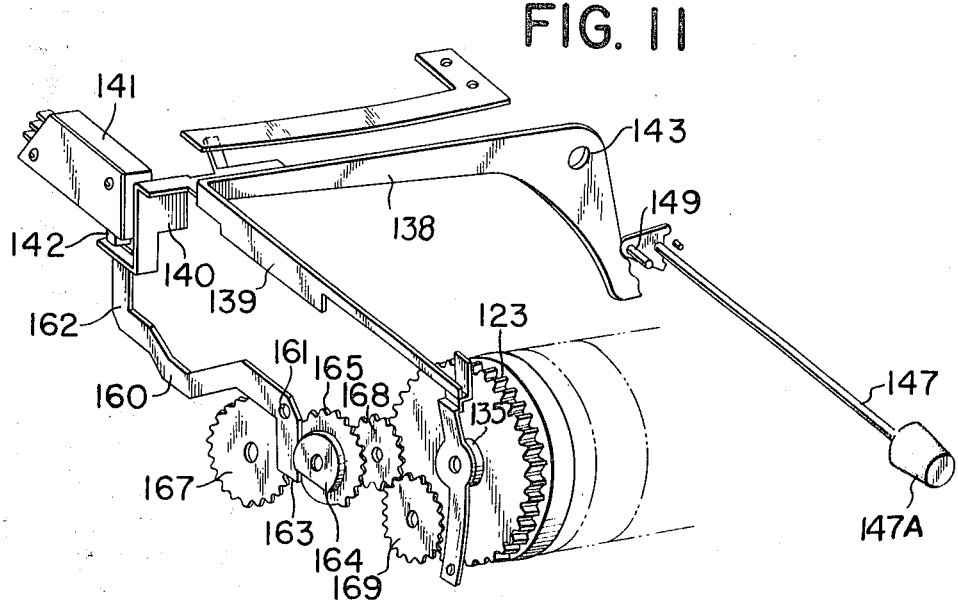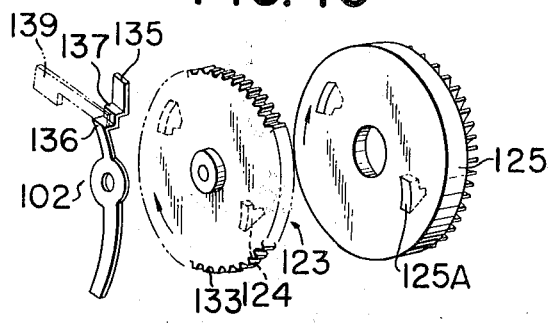

United States Patent Office 3,609,956
Patented Oct. 5, 1971

3,609,956
NUMERICALLY INDICATING TIMEKEEPER ATTACHED WITH TIMER AND/OR ALARM
Takashi Funaki, Shimosuwa-machi, Suwa-gun, Nagano-ken, Japan, assignor to Kabushiki Kaisha Sankyo Seiki Seisakusho, Shimosuwa-machi, Suwa-gun, Nagano-ken, Japan
Filed July 28, 1969, Ser. No. 845,147
Claims priority, application Japan, July 27, 1968, 43/53,275
Int. Cl. G04c *21/28*
U.S. Cl. 58—20                3 Claims

ABSTRACT OF THE DISCLOSURE

A timekeeper provided with a timer, or alarm, or both indicates time with numerals on a plurality of time indicating wheels. The wheels are rotatably mounted on a main shaft except one which is fixed to the main shaft. The timekeeper includes locking discs formed integrally with the time indicating wheels, a plurality of pinions freely rotatable around a separate shaft, a time setting wheel and a cam plate engageable therewith after a preset time, a time adjusting knob also operable for setting time on the time setting wheel, a control knob cooperating with a control lever, and a spring plate disengaging one arm of the control lever for operating a timer switch and also an alarm at a preset time. The timekeeper in another aspect of the invention is further provided with another control lever which is operated by a cam wheel rotatable by the time adjusting knob, whereby the duration of an "AUTO" period may be determined by the time adjusting knob.

BACKGROUND OF THE INVENTION

This invention relates generally to timekeepers or timepieces, and more particularly to a new and improved type of digitally displaying timepiece, wherein hours, minutes, and seconds are displayed in digits inscribed on a plurality of rotating drums, and which has a timer mechanism or an alarm mechanism or both combined therewith.

Heretofore known digitally displaying timepieces employing a plurality of rotating drums have been accompanied by drawbacks such as inaccurate operation, difficulty in the adjustment of the time setting, and tendency of becoming large in size. Furthermore, the operation of the timer and/or alarm incorporated in such timepieces was not simple and was frequently erroneous.

In addition, timers which stop after a certain time period from a given time instant have been known. However, no timer has yet been devised which can resume its operation after a certain period from the instant at which the above described operation of the timer has been stopped. Yet, in various fields there is an urgent demand for a timer which allows the user, while reading a book or listening to music, to fall asleep, whereupon, for instance, an electric light or a radio is automatically turned off, and, at a predetermined time in the morning, the timer can resume its operation for operating an alarm device.

SUMMARY OF INVENTION

Therefore, a primary object of the present invention is to provide a timepiece which is accurate in keeping time, easy in the adjustment of the time setting, and small in size.

Another object of the present invention is to provide a timepiece of digitally displaying type which is provided with an alarm or a timer mechanism and is made selectively operable after a predetermined time.

Still another object of the invention is to provide a timepiece with a timer, an alarm, or both wherein the timer can be automatically turned off after a preset time period of the operation, and, after a predetermined period, the timer or the alarm can operate again automatically.

Still another object of the present invention is to provide a timepiece provided with a timer and/or alarm, wherein locking discs are further provided for the indicating wheels and undesirable movement of the indicating wheels, for instance, due to shocks or impact stresses is thereby prevented.

A further object of the invention is to provide a timepiece having a timer and/or alarm, wherein the time adjustment and the time setting can be achieved by a simple manipulation of one knob.

A still further object of the invention is to provide a timepiece having a timer and/or alarm, wherein another control knob is provided in addition to the above mentioned one knob, whereby "ON," "OFF," "AUTO," and "ALARM" operations can be freely selected by the control knobs.

These and other objects of the present invention can be achieved by a novel construction of a timepiece provided with a timer and/or alarm which comprises a plurality of time indicating wheels which are freely and rotatably mounted on a main shaft except one which is fixedly mounted on the same shaft, a plurality of locking discs formed integrally with the time indicating wheels, a plurality of pinions rotatably mounted on a separate shaft, a time setting wheel and a cam plate also mounted rotatably on the main shaft, the latter plate being engageable with the time setting wheel upon arrival of the preset time, a time adjusting knob cooperable with a control lever, and a spring plate for disengaging one arm of the control lever for activating a timer switch by another arm and for controlling the operation of an alarm by still another arm of the control lever. The timepiece in another aspect of the invention is further provided with another control lever which is operable under the action of a cam wheel rotated by the time adjusting knob, whereby the duration of "AUTO" operation can be varied by the time adjusting knob.

The nature, principle, and utility of the invention will be more readily apparent from the following detailed description with respect to preferred embodiments of the invention when read in conjunction with the accompanying drawings, in which like parts are designated by like reference numerals.

BRIEF DESCRIPTION OF THE DRAWINGS

In the drawings:

FIG. 7 is a bottom view of the same timekeeper;

FIG. 8 is a side elevation of the same timekeeper example observed from the left-hand side thereof;

FIG. 9 is a rear view of the same example of the timekeeper;

FIG. 10 is a perspective exploded view of a time setting mechanism employed in the same timekeeper.

FIG. 11 is a perspective view of an "AUTO" mechanism employed in the same timekeeper example; and FIGS. 12(a) through 12(c) are explanatory diagrams indicating the operation of the timer switch according to the invention.

DETAILED DESCRIPTION

The organization of a timepiece provided with a timer and/or alarm and constituting an embodiment of the present invention will now be described with reference to FIGS. 1 through 5.

(1) Timekeeping mechanism

Figure 1:
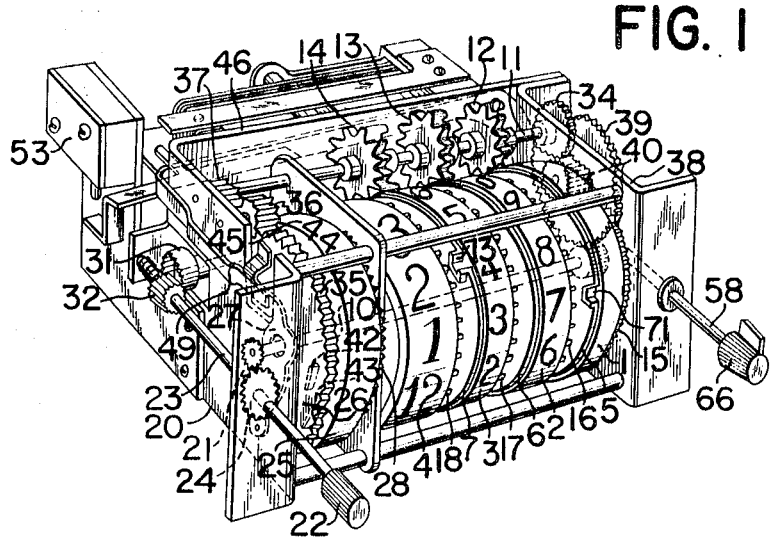
FIG. 1 is a perspective view of a numerically indicating timekeeper provided with a timer and/or alarm constituting one embodiment of the present invention.
Figure 2:
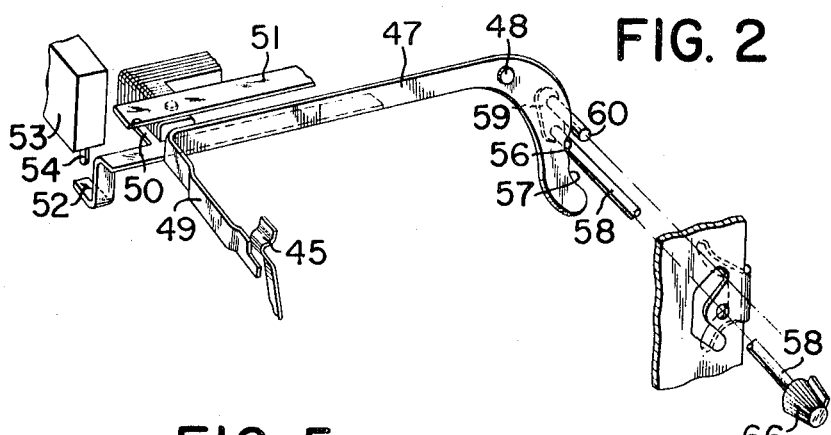
FIG. 2 is a perspective view of a control lever for a timer and alarm employed in the timekeeper shown in FIG. 1.
Figure 5:
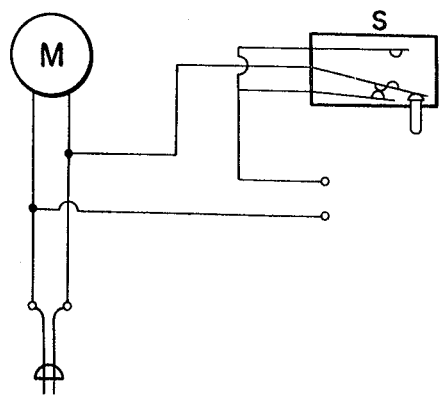
FIG. 5 is an electric circuit diagram of a circuit employed in the timekeeper embodying features of the invention.

As shown in FIG. 1, the timepiece according to the present invention includes, as its essential components, time indicating wheels 1, 2, 3, and 4, each of which is constructed in the form of a disk-like rotating drum, and, on the peripheral surface of which a required number of numerals are printed or engraved with equal angular spacing between each other. More specifically, the wheel 1 which is in itself a "second" indicating wheel is inscribed with numerals from "0" through "59"; the wheel 2 which is a "minute" indicating wheel also inscribed with numerals from "0" to "9"; the wheel 3 which is a "tens of minutes" indicating wheel is inscribed with numerals from "0" to "5" in sequence appearing twice over the circumference of the wheel 3; and the wheel 4 for indicating "hours" is inscribed with numerals from "1" to "12."

The indicating wheels are supported on a main shaft 10 so that they are freely rotatable except for the wheel 2 which is fixedly mounted on the shaft 10. On the left sides of the "second" indicating wheel 1, "minute" indicating wheel 2, and the "tens of minutes" indicating wheel 3, there are provided locking discs 5, 6, and 7, respectively, which are fixedly coupled to the corresponding wheels 1, 2, and 3.

Pinions 12, 13, and 14 are supported rotatably on a shaft 11 extending horizontally and in parallel with the shaft 10. The right side half of the tooth width of each of the pinions 12, 13, and 14 is so constructed that every other tooth therein are omitted and that the number of teeth is reduced to one half of that in the left side half thereof. The remaining teeth of the right side portions of the pinions 12, 13, and 14 contact the peripheral surfaces of the locking discs 5, 6, and 7, whereby the indicating wheels are restricted from free rotation on the shaft 10.

Gear wheels 15, 16, 17 and 18 are provided at the right sides of the indicating wheels 1, 2, 3, and 4 of these, the gear wheel 15 is coupled to an electric motor 19 through a reduction mechanism, the other gear wheels 16, 17, and 18 mesh with the teeth on the left halves of the pinions 12, 13, and 14. Near the peripheral surfaces of the locking discs 5 and 6 fixed to the indicating wheels 1 and 2, are notches 71 and 72, respectively, and, at similar positions on the side surface of the locking disc 7 fixed to the indicating wheel 3, are a pair of diametrically opposed notches 73, 73.

When the teeth of a reduced number on the right side halves of the pinions 12, 13, and 14 engage with any one of the notches 71, 72, and 73 on the locking discs 5, 6, and 7, the teeth of the left half side of the pinion drive the corresponding one of the gear wheels 16, 17, and 18 and thereby rotate the indicating wheel attached thereto by one division. It should be noted that although the gear wheels 15, 17, and 18 are fixedly coupled to the corresponding indicating wheels 1, 3, and 4, the gear wheel 16 is coupled with the "minute" indicating wheel 2 through a frictional coupling.

On the leftward end of the main shaft 10 projecting through a left side base plate 20 constituting a rigid part of the entire device, there is mounted a gear wheel 21 which engages another gear wheel 24 fixedly mounted on a time adjusting shaft 23 which is operated by a knob 22 on the front panel of the timepiece.

The exact location of the notch 71 for the "second" indicating wheel 1 is determined so that the notch 71 just engages the pinion 12 when the numeral "60" of the indicating wheel 1 appears in an indicating window of the device. Likewise, the exact position of the notch 72 for the "minute" indicating wheel 2 is so determined that it just engages with the pinion 13 when the numeral "9" appears in the window, and the positions of the notches 73, 73 for the "tens of minutes" indicating wheel 3 are so determined that one of the notches 73, 73 is just engaging with the pinion 14 when the numeral "5" appears in the window.

(2) Timer and alarm mechanism

A time setting wheel 25 and a cam plate 26 are inserted rotatably on the above described main shaft 10 and are thereafter elastically urged rightwardly by means of a leaf spring 27. Between the time setting wheel 25 and the "hour" indicating wheel 4, a slip ring is provided to couple together these two members frictionally.

Figure 3:
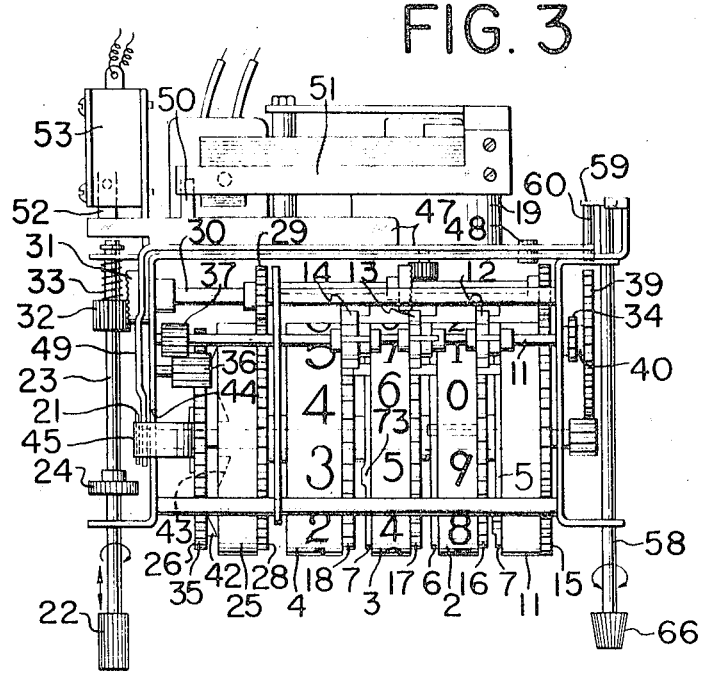
FIG. 3 is a plan view of the timekeeper shown in FIG. 1.

On the right side portion of the time setting wheel 25, a gear wheel 28 is provided to engage with a pinion 29 (see FIG. 3). The shaft 30 of the pinion 29 projects through a left side base plate and fixedly supports a crown gear 31 at the end of the shaft 30. The crown gear 31 is normally engaged with a pinion 32 fixedly mounted on the time adjusting shaft 23. On the time adjusting shaft 23 is a coil spring 33. When the time adjusting shaft 23 is pushed inward against the resistive force of the spring 33, the pinion 32 is shifted inside the periphery of the crown gear 31 was to be disengaged from the crown gear 31, and a forwardly located gear 24 is brought into engagement with the gear wheel 21 on the main shaft 10.

On the circumference of the cam plate 26, teeth are cut to form a gear wheel 35. This gear wheel 35 is engaged with a gear wheel 36, which in turn meshes with another gear wheel 37 fixedly mounted on the shaft 11 on which the idler pinions 12, 13, and 14 are mounted.

On the right end of the shaft 11 projecting through the right base plate 38, a gear wheel 34 is fixedly mounted. The gear wheel 34 is coupled to a gear wheel 41 fixedly mounted on the right end of the main shaft 10 through reduction gears 39 and 40.

On the left side surface of the time setting wheel 25, recessed portions 43 receive projecting portions 42 of the time setting cam plate 26. The peripheral surface of the time setting wheel 25 have numerals indicating time settings printed or engraved thereon.

The upper end of the plate spring 27 for depressing the cam plate 26 is bent leftwardly so that the end projects through a recessed portion 44 of the base plate and forms a stopper portion 45.

A control lever 47 is pivotally mounted on the rear side of a rear base plate by means of a pivot pin 48. The control lever 47 is extended leftwardly, as shown in FIG. 3, and the leftward end of the lever 47 is trifurcated so that the foremost branch 49 thereof engages with the stopper portion 45 for the subsequent disengagement and start of the operation at a desired time. The rearmost branch 50 is located below a magnetic vibrator 51 for the restriction of the vibrator 51. A central branch 52 may be employed to activate a pin 54 of a micro-switch 53 in an up-and-down movement.

The rightward half of the control lever 47 is bent downwardly, and a plurality of cam slots 56, 57 are provided along the outer edge of the above described bent portion of the lever 47.

A control shaft 58 is provided so as to penetrate through the front and rear base plates located at the right side of the timepiece so that the rear end of the shaft 58 protrudes through the rear base plate 46 and is connected with a crank arm 59 on which is implanted a forwardly extending control pin 60. The control pin 60 may be selectively engaged in either one of the cam slots 56, 57 on the outer edge of the downwardly bent end of the control lever 47, and the tip of the control pin 60 is passed through an arcuate groove 61 bored through the forward end of the base plate.

The control lever 47 is constructed so that the trifurcated end of the lever may be turned downwardly around the pivotal point 48 under gravity. The micro-switch 53 is constructed in a manner such that the upper and the lower contacts 63 and 64 are spaced apart at a considerable distance, and an intermediate contact 65 of the micro-switch 53 may be maintained at a position contacting neither of the contacts 63, 64 as shown in FIG. 4(b).

The operation of the timepiece constituting an embodiment of the invention will now be described.

(1) Operation of the timekeeping mechanism

Under the operation of the electric motor 19, the "second" indicating wheel 1 is rotated one full turn per minute. As a result, the notch 71 provided on the locking disc 5 at the left side of the "second" indicating wheel 1 is rotated to be engaged with a tooth of the right side portion of the pinion 12, and the pinion 12 is thereby rotated through an angle corresponding to one tooth of that portion. Thus the left side half of the pinion 12 rotates the gear wheel 16 coupled to the "minutes" wheel so that the "minute" wheel 2 is rotated through one division.

When the "minute" wheel 2 is rotated one complete turn, the notch 72 provided on the locking disc 6 at the left side of the "minute" wheel 2 is brought to the position where the notch 72 engages a tooth at the right side portion of the pinion 13, and the pinion 13 is thereby rotated through an angle corresponding to one tooth displacement. The left side half of the pinion 13 then rotates the gear wheel 17 for the "tens of minutes" indicating wheel 3, and rotates the latter through one scale division.

Likewise, by means of notches 73 provided on the locking disc 7 at the left side of the "tens of minutes" indicating wheel 3, the "hour" indicating wheel 4 is shifted by one scale division each time the "tens of minutes" indicating wheel 3 is rotated one half turn.

In this manner, the hours, tens of minutes, minutes, and seconds, for the indication of the time, are indicated digitally in the window of the timepiece.

When it is desired to adjust the indication of time, the time adjusting knob 22 at the left side of the device is first pushed rearward, so that the pinion 32 is disengaged from the crown gear 31 and the gear 24 is engaged with the gear 21. Then the knob 22 is rotated so that the main shaft 10 is rotated for rotating the "minute" indicating wheel 2 which is fixedly mounted on the main shaft 10. Thus, the "minute" indicating wheel 2 and the subsequent indicating wheels 3, 4 are rotated until a desired digital indication is obtained in the window of the device.

Since the gear wheel 16 is coupled frictionally to the "minute" indicating wheel 2 through a slipping spring plate (not shown), the aforementioned rotation of the "minute" indicating wheel 2 is not transmitted back to the "second" indicating wheel 1, and no malfunctioning effects is exerted on the electric motor 19 coupled to the "second" indicating wheel 1.

(2) Operation of the time setting mechanism

When the knob 22 is rotated without being pushed into the device, the rotation of the shaft 30 rotates the time setting wheel 25 through the gears 28, 29 because the pinion 32 is engaging with the crown gear 31, whereby the time is set to a value indicated through the time setting window of the device. At this time, since the time setting wheel 25 is held in its position through a slipping spring plate (not shown) provided between the time setting wheel 25 and the base plate, the wheel 25 must be rotated with a stronger force than that corresponding to the frictional torque caused by the spring plate.

During the operation, the main shaft 10 is rotated because the shaft 10 is fixed to the "minute" indicating wheel 2 which is rotated by the "second" indicating wheel 1. The rotation of the main shaft 10 is conveyed through a series of reduction gears to the shaft 11 on which the idler pinions 12, 13, and 14 are supported freely rotatably, so that a gear 37 fixedly mounted on the leftward end of the shaft 11 is rotated.

Rotation of the gear 37 thereafter rotates the time setting cam plate 26 through the gears 35, 36. However, since the torque exerted by the time setting cam plate 26 to the time setting wheel 25 is not large enough to rotate the latter against the frictional torque caused by the slip spring plate, there is no possibility of the time setting wheel 25 being moved away from the set position. When a time set on the time setting wheel has come, the projections of the cam plate 26 fall into the recessed portions 43 on the side of the time setting wheel 25 under the repulsive force of the plate spring 27, and the upper bent portion of the plate spring 27, that is the stopper portion 45 of the spring plate, is thereby pulled back into the recess 44 provided in the left side base plate. The retraction of the stopper portion 45 releases an arm 49 of the control lever 47, and, if there are no members restricting the movement of the control lever, the left half of the control lever descends under its own weight, and the stopper 50 acting on the vibrating piece 51 of the buzzer is thereby released for operating the buzzer.

The up-and-down movement of the control lever is further limited depending on the locking positions at the rightward end of the control lever, and in some cases, the control lever is not allowed to move down even when the time setting device has operated, and the buzzer is not operated as will be disclosed hereinafter.

In the above described operation, the main shaft 10 is rotated intermittently for one tenth of a revolution every minute. However, since the rotation of the time setting cam plate 26 is relatively reduced by means of the reduction gears, the time setting cam plate 26 rotates one complete turn in 12 hours.

It should also be noted that the projections 42 of the time setting cam plate 26 are automatically disengaged from the recessed portions 43 on the side surface of the time setting wheel as in the case of the conventional timepiece of this kind.

(3) Operation of the timer and alarm mechanisms

As described above with respect to the time setting mechanism, the control lever 47 descends under the control of the time setting mechanism, and one of the branched lever 52 activates the pin 54 of the micro-switch 53 so that it is thrown into "ON" state. The micro-switch 53 has a construction as illustrated in FIG. 4 wherein the central contact 65 of the micro-switch abuts the upper contact 63 when the pin 54 is pushed upward by means of the lever 52, thereby switching the related circuit into "ON" state, the central contact 65 being shifted to the neutral "OFF" position when the pin 54 is pushed down to the next step. Then, when the pin is further pushed down, the central contact 65 can abut the lower contact 64 through the resilience of the arm of the central contact (the arm of the central contact is so constructed that it is urged to abut the lower contact when no outside force is applied thereto) thereby turning the lower contact circuit into "ON" state.

Whenever an electric source is connected to the above described micro-switch, "ON-OFF" operation of the applied circuit may be achieved at any present time.

The control of the alarm and timer mechanisms is carried out by turning a knob 66 located at the right-hand side of the timepiece according to the present invention. When the knob 66 is turned to either side, the pin 60 provided at the rear end of the control shaft 58 is moved along an arcuated path urging the cam surface of the control lever 47 by the side of the pin 60 and rotating the entire control lever 47 around its pivotal shaft 48. Thus, the degree of rotation of the control lever 47 is determined by the recessed positions 56, 57 of the cam surface wherein the pin 60 of the control shaft 58 has been preset for an engagement, and the thus set position of the control pin 60 is indicated by the location of the front end of the pin 60 in the slot which is arcuatedly extended between its extremities 67 and 68.

The operation of the control shaft 58 in cooperation with the control lever 47 will now be described in more detail with reference to FIG. 4.

Figure 4A:
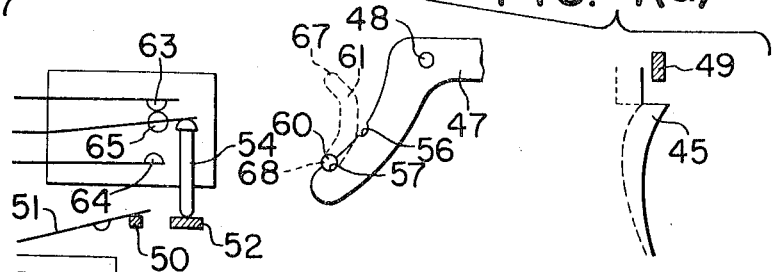
FIGS. 4(a) through 4(d) are views diagrammatically indicating relationships between the positions of the control lever and the engaging positions of a timer switch and an alarming buzzer, and also the engaging position of a stopper operated by a time setting cam.
Figure 4B:
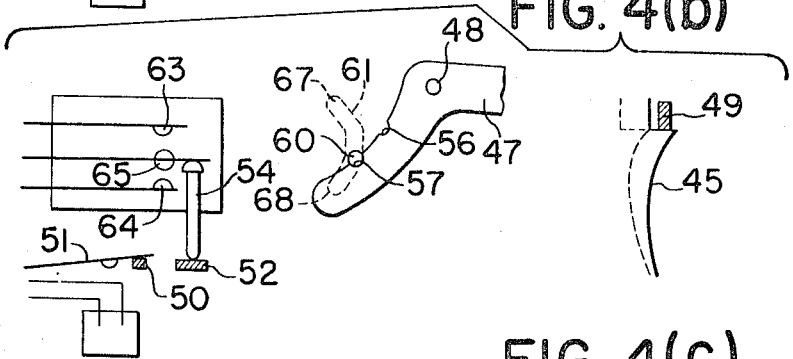

(1) FIG. 4(a) shows a case wherein the pin 60 is set to the lowermost position. In this case, the trifurcated portions of the control lever 47 are at their uppermost positions, wherein the front branch 49 thereof is located above the stopper 45 (see right side diagram), and the rear branch 50 thereof raises the vibrating piece 51 of the buzzer so that the buzzer is thereby locked. The central branch 52 of the control lever 47 pushes up the central contact 65 of the micro-switch so that the upper contact 63 is thereby abutted and the related circuit (see FIG. 5) is thereby turned "ON."

(2) FIG. 4(b) illustrates another case wherein the pin 60 is set to the second lowest position. In this position, the pin 60 engages the recess 57 of the cam surface of the control lever 47, and the trifurcated lever portions are located a little lower than in the above described case. In this position, the front branch 49 is still in the engaging position with the stopper portion 45 of the time setting mechanism. The central branch 52 maintains the central contact 65 at the neutral position of the micro-switch 53 whereby the electric circuit related thereof is turned "OFF." The rear branch of the control lever 47 still maintains the vibrator 51 of the buzzer upward and the buzzer is thereby blocked.

Figure 4C:
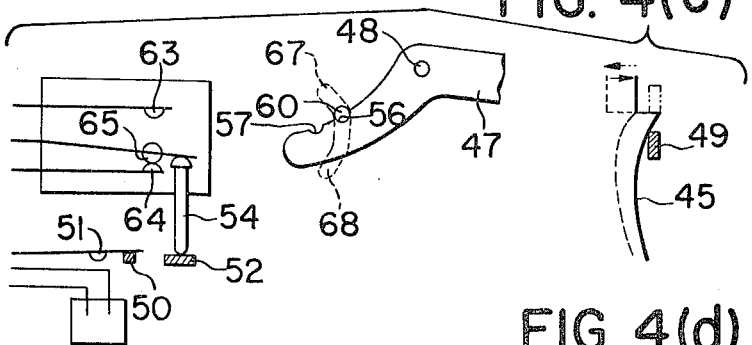

(3) FIG. 4(c) shows still another case wherein the pin 60 is set the second highest position 56 (AUTO position).

(a) Prior to the operation of the time setting mechanism

In this case, the stopper 45 of the time setting device is projecting from the recess 44 of the base plate. As a result, the front branch 49 of the control lever 47 is blocked by the stopper 45, and other branched portions of the control lever 47 are also held in the same condition as in the case of the item (2) above.

(b) After the operation of the time setting mechanism

In this case, the stopper 45 of the time setting device is retracted into the recess 44, and the front branch 49 of the control lever 47 descends. The central contact 65 of the micro-switch contact the lower contact 64, and the electrical circuit is thereby turned "ON." However, the vibrator 51 of the buzzer does not yet come into the magnetically excited region.

Figure 4D:
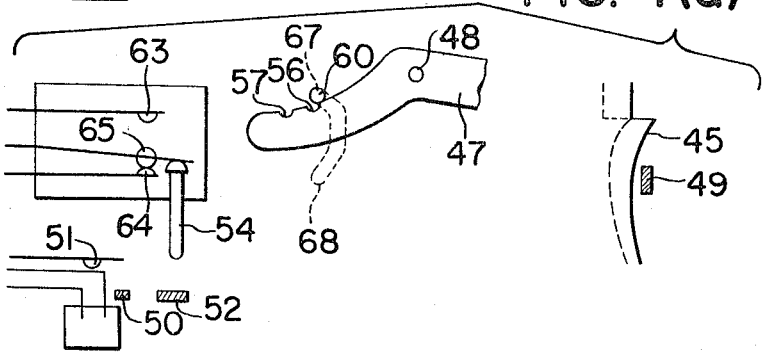

(4) FIG. 4(d) illustrates the case wherein the pin 60 of the control shaft 58 is set to the highest position 67 in the arcuated slit (Alarm Position).

(a) Prior to the operation of the time setting mechanism

In this case, the operating conditions are quite similar to the item (2) above.

(b) After the operation of the time setting mechanism

In this case, the micro-switch 53 is thrown into "ON" at the lower contact, and the vibrator 51 is also brought into the magnetically excited region.

Another construction of the timepiece which is also incorporated with a timer and/or alarm mechanisms and constituting another embodiment of the present invention will be described with reference made to FIGS. 6 through 12.

(1) Timekeeping mechanism

As shown in FIGS. 6 through 9, the timepiece of this embodiment has a base plate 101, and a main shaft 102 is provided so that it runs horizontally through the right and left sides of the base plate 101. On the main shaft 102, time indicating wheels 103, 104, 105, and 106, all of which are of rotating drum type, are mounted. The indicating wheel 103 is a "second" indicating wheel, the wheel 104 being a "minute" indicating wheel, the wheel 105 being a "tens of minutes" indicating wheel, and the wheel 106 is an "hour" indicating wheel.

Among these time indicating wheels, the "minute" indicating wheel 104 is fixedly mounted on the main shaft 102, and other indicating wheels 103, 105, and 106 are freely rotatably mounted on the main shaft 102. On the right-hand sides of the indicating wheels (as seen from front of FIG. 6), gear wheels 107, 108, 109, and 110 are provided, and on the left-hand side of the same wheels (except of the "hour" indicating wheel 106), tooth formed plates 111, 112, and 113 are provided (see FIG. 2). These right-hand side gear wheels and the left-hand side tooth formed plates are engaged with pinions 115, 116, and 117 which are freely rotatably mounted on a shaft 114, whereby the indicating wheels 104, 105, and 106 are rotated intermittently as described for the first embodiment of the present invention.

An electric motor 118 (see FIG. 9) is provided at the rear portion of device, and the output of the motor 118 is transmitted through a reduction gear mechanism 119 to a pinion 120 and then to a crown gear 121 and further to a gear 122 mounted on the same shaft as the crown gear 121. Rotation of the gear 122 is thereafter transmitted to the gear wheel 107 provided at the right-hand side of the "second" indicating wheel 103, and the "second" indicating wheel 103 is thereby rotated. The rotation of the "second" indicating wheel 103 is then transmitted intermittently to the subsequently disposed time indicating wheels 104, 105, and 106.

(2) "AUTO" and "ALARM" operations employing the time setting mechanism

A time setting wheel 125 (see FIGS. 6 and 10) are also provided, and on the left-hand side of the time setting wheel 125, a time setting cam plate 123 is also freely rotatably mounted on the main shaft 102. On the right-hand side of the time setting cam plate 123 a pair of cam projections 124 each formed into two steps are provided, and the two stepped projections 124 engage a pair of recesses 125A provided on the left-hand side surface of the time setting wheel 125. On the peripheral surface of the time setting wheel 125, numerals employed for the time setting are printed or engraved.

The driving mechanism for the time setting wheel 125 is shown in FIG. 7, wherein a pinion 126 fixedly mounted at the end of the main shaft 102 meshes with a gear wheel 127, and a pinion 128 provided integral with the gear wheel 127 meshing with a gear wheel 129 mounted on an end of a shaft 130, whereby a pinion 131 mounted on the other end of the shaft 130 is rotated, and the pinion 131 in turn meshes through an idle gear wheel 132 with the gear wheel 133 formed on the peripheral surface of the time setting cam plate 123 for rotating the same cam plate 123. Since the main shaft 102 is fixed to the."minute" indicating wheel 104, the rotation of the "minute" indicating wheel 104 is transmitted to the time setting cam plate 123 with the number of rotation being reduced at a predetermined ratio.

At the left-hand side of the time setting cam plate 123, a resilient plate 135 is loosely mounted on the main shaft 102, and the time setting cam plate 123 is thereby depressed to the time setting wheel 125. The resilient plate 135 is provided with two arms, and on one arm thereof are provided two steps 136, 137 (as shown in FIG. 10). A trifurcated lever 138 is also provided at the rear portion of the timepiece pivotally mounted on the base plate 101 by a pivot pin 143. The foremost branched arm 139 of the trifurcated lever 138 engages with the aforementioned two steps 136, 137 of the resilient plate 135, the central branched arm 140 thereof being bent downward for cooperating with an operating pin 142 of a micro-switch 141, and the rearwardly projecting branched arm 144 (see FIG. 9) is abutting underside of a vibrating piece 146 of a buzzer 145.

The trifurcated lever 138 is, as shown in FIG. 11, bent downward at the right-hand side of the pivot pin 143 and three recesses are provided on the outer edge of the bent portion of the lever 138. These recesses serve to receive a pin 149 provided at the rear end of a timer controlling lever 147, whereby the trifurcated lever 138 is controlled in three steps.

On the side (left side) of the timepiece opposite the above mentioned timer controlling lever 147, a time adjusting lever 150 is provided. On the lever 150 (see FIG. 6), there are fixedly mounted a pinion 152 engaged with a crown gear 151 and a gear wheel 154 engaged with another gear wheel 153. A coil spring 155 is also provided on the time adjusting lever 150 at a portion between the pinion 152 and a rear portion of the base plate 101, so that the lever 150 is pushed forward.

As shown in FIG. 10, the two steps 136, 137 formed on one arm of the resilient plate 135 function cooperatively with the two stepped cam projections 124 provided on a side surface of the time setting cam plate 123. More specifically, the interval between the two steps of projections 124 corresponds to an angular displacement of the time setting cam plate 123 during a time period of from 5 to 10 minutes, and at a given instant, the first step of the cam projections falls into the recesses 125A on the time setting wheel 125. As a result the resilient plate 135 is displaced right-wardly, and the lever 139 falls from the step 137 to the step 136.

The falling of the lever 139 lowers the central branched arm 140 of the trifurcated lever 138 from the operating pin 142 of the microswitch 141, whereby the switch 141 is thrown into "ON" (AUTO) state. After approximately five minutes, the second step of the cam projections falls into the recesses 125A, and the resilient plate 135 is further displaced toward right. The lever 139 further falls from the step 136, and the rearmost branched arm 144 (see FIG. 6) releases the engagement with the vibrator 146 of the buzzer 145, whereby the buzzer 145 starts sounding for the first time.

Summarizing the above description, the timer operation is first brought into "AUTO" state before the buzzer is operated, thus causing an alarm function to be accomplished, and after an interval thereafter the buzzer is operated to afford a so-called double-alarm operation. Of course, when the object is attained by the first alarming operation ("AUTO"), there is no necessity of sounding the annoying buzzer, and the buzzer is locked by turning the knob 147A.

(3) "AUTO" operation by manual procedure

Figure 6:
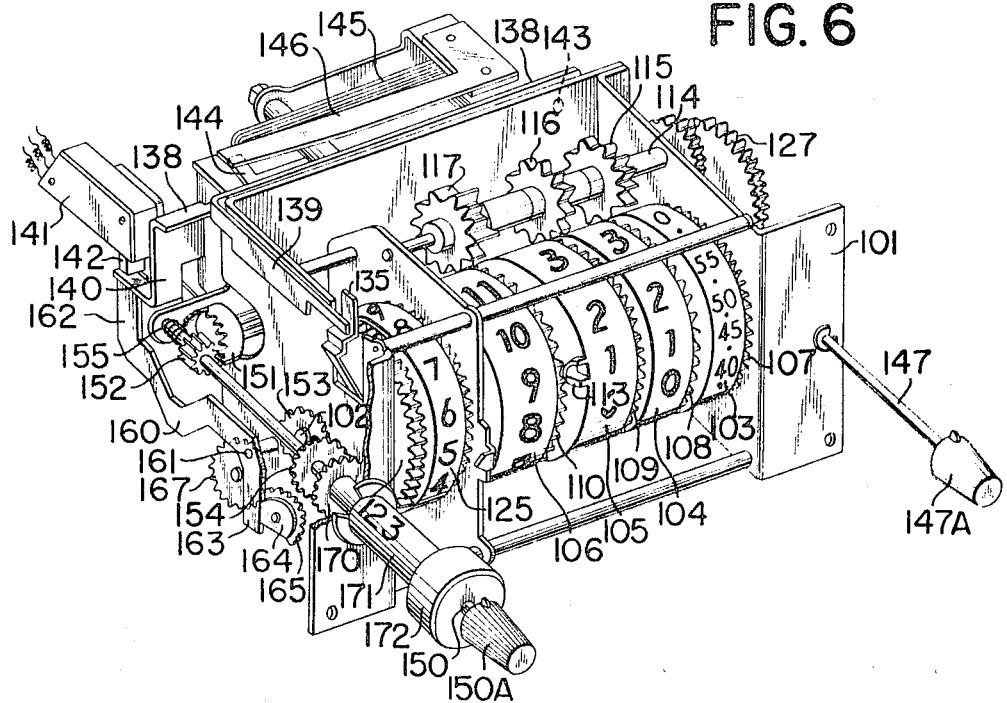
FIG. 6 is a perspective view of another type of numerically indicating timekeeper constituting another embodiment of the invention.

As shown in FIGS. 6, 8, and 11, an operational lever 160 is pivotally mounted on the base plate 101 through a pivot pin 161, and one end 162 of the lever 160 is extended to cooperate with the pin 142 of the microswitch 141. The other end 163 of the lever 160 is extended downwardly so that an edge thereof cooperates with a cam 164. The cam 164 is formed integrally with a frustrated gear wheel 165 rotatably mounted on the right-hand side base plate 101. The gear wheel 165 is also meshed with another gear wheel 167. This gear wheel 167 is frictionally coupled to an end of a shaft 130 as seen in FIG. 7 employing a spring 159, and rotated from the main shaft 102 in a reduced manner by a train of gear wheels 126, 127, 128 and 129.

At the rear side of the frustated gear wheel 165, a small gear wheel (not shown) is provided, and the small gear wheel is meshed with a gear wheel 168 which in turn meshes with another gear wheel 169. The latter mentioned two gear wheels 168 and 169 are rotatably mounted on the base plate. The gear wheel 169 meshes with a gear wheel 170 shown in FIG. 6. The gear wheel 170 is fixedly mounted at an end of a sleeve 171 freely rotatably mounted on the time adjusting shaft 150, to the other end of which is attached a time adjusting knob 172. As a result, the cam 164 can be rotated by rotating the time adjusting knob 172, and when the cut portion of the cam 164 abuts the operational lever 160, the lever 160 is separated from the operating pin 142 of the microswitch 141. When the cam surface of the cam 164 abuts the operational lever 160, the lever 160 is depressed downwardly by the surface of the cam 164, whereby the other end of the operational lever 160 pushes up the operating pin 142 of the microswitch 141.

Thus, the duration of time wherein the operating pin 142 of the microswitch 141 depressed is determined by the rotating angle of the time adjusting knob 172, that is, by the contacting position of the operational lever 160 against the periphery of the cam 164. This is because the operating pin 142 of the switch 141 is released when the operational lever 160 again abuts the cut portion of the cam 164 after a period during which the cam 164 is rotated back by the clock mechanism through the angle of rotation of the knob 172.

The switch 141 is constructed as shown in FIG. 12 so that the central movable reed contact 175 is maintained by its own resilience in contact with the lower contact point 176 when the central reed contact 175 is left free, thereby placing the switch in "ON" state, and when the operating pin 142 is pushed up to its neutral position, the switch is placed to "OFF" state. When the pin 142 is further pushed up to its upper position, the central contact 175 contacts the upper contact point 177 for placing the switch in the "ON" state.

With the construction of the timer as described in the first embodiment, the switch 141 cannot be placed in the "ON" state as long as the lever 139 for operating the switch 141 is engaged with the resilient plate 135, that is, as long as the time setting mechanism had not yet descended. However, with the construction of the timer as disclosed in this embodiment, the timer may be operated independently of the time setting mechanism by turning the time adjusting knob 172 as described above.

The operation of this example of the timepiece according to the invention will now be described.

Since the timekeeping mechanism, the time setting mechanism, and the alarm mechanism are similar to these of the first embodiment of the invention except the two stepped cam projections 124 and the two stepped resilient plate 135, the description of the operations of these mechanisms are omitted, and the operation of the "AUTO" mechanism constituting the most important feature of this embodiment of the invention will be described hereinbelow.

When the "AUTO" mechanism is not operating, the cutout portion of the cam 164 is abutting the vertical portion 163 of the operational lever 160, and the opposite end 162 thereof is separated from the operating pin 142 of the switch 141. As a result, even when the gear wheel 167 (FIG. 11) is rotated by the clock mechanism, the cam 164 is not rotated because the toothless portion of the gear wheel 165 is confronting the gear wheel 167.

When the "AUTO" mechanism is desired to be operated for a specific length of time, the knob 172 (FIG. 6) is rotated through an angular displacement corresponding to the length of time. Then the rotation of the knob 172 is transmitted through 170, 169a, 169, 168, and 165 in this sequence (see FIG. 8) to the cam 164, whereby the cam 164 is rotated through a desired angle. As a result, the peripheral portion of the cam 164 now contacts the vertical portion 163 of the operational lever 160, and the lever 160 is thereby rotated so that the opposite end 162 of the lever pushes up the operating pin 142 of the switch 141 and the switch 141 is brought into "ON" state as shown in FIG. 12(a).

When the knob 172 is rotated, although the rotation of the gear wheel 165 rotates the gear wheel 167 engaging therewith, the rotation of the gear wheel 167 is not transmitted to the shaft 130 because of the existence of friction coupling employing the spring 159 and any harmful effect on the shaft 130 and the subsequent clock mechanism is thereby eliminated. More specifically, when the gear wheel 167 is driven by a stronger force than the frictional torque bearable by the friction coupling, a slip is caused between the two members of the coupling portion.

In the meantime, the gear wheel 165 is rotated by the gear wheel 167 which is rotated by the clock mechanism, and the cam 164 formed integrally with the gear wheel 165 is thereby rotated. After a time period determined by the rotating angle of the knob 172, the cutout portion of the cam 164 abuts the vertical portion 163 of the operational lever 160, whereby the operational lever 160 is rotated around the pivot pin 161 by its own weight, and the opposite end 162 of the lever 160 releases the operating pin 142 of the switch 141. The switch 141 is thereby brought into "OFF" state as shown in FIG. 12(b). In this case, since the toothless part of the gear wheel 165 confronts the cutout portion of the cam 164, the wheel 165 is not rotated further by the gear wheel 167.

Although the above described operation corresponds to a case where the "AUTO" mechanism manually places the switch 141 to "ON" state for a predetermined period from the present time, the "AUTO" mechanism may also be operated in such a manner that the switch is operated into "ON" state automatically after a predetermined time period. Such an operation can be achieved by the lever 139 which descends from the steps of the resilient plate 135, whereupon another arm 140 of the same lever releases the operating pin 142 of the switch 141, and the switch 141 is thereby brought into "ON" state as shown in FIG. 12(c).

Since the "AUTO" mechanism of the timepiece constituting the second embodiment of the present invention is organized as described above, it can be advantageously utilized for various convenient operations. For example, when a user wishes to fall asleep while listening to the radio and wishes that the radio be automatically turned "OFF" after a predetermined time period, and also that the operation of the radio or any other electrical instrument be automatically started at a predetermined time the next morning, the knob 150A on the front panel is first turned to preset the time setting wheel 125 to 6 o'clock of the next morning, for example, and then the knob 172 is rotated to preset, for instance, to 30 minutes. In this manner, the switch 141 can be immediately thrown into "ON" state to operate the radio, the radio can then be automatically turned "OFF" after 30 minutes and then operated once again at 6 o'clock the next morning.

What is claimed is:

1. In a timekeeper provided with a timer and an alarm comprising "second," "minute," "tens of minutes," and "hour" indicating wheels, means for driving said "second" indicating wheel, a main shaft coaxially supporting said indicating wheels, means for transmitting movements of lower order indicating wheels to higher order indicating wheels, said means comprising a plurality of gear wheels fixed to one side of said indicating wheels, teeth portions provided on the other sides of said indicating wheels, and a plurality of idler pinions coaxially mounted on a separate shaft, one widthwisely half portion of each of the pinions meshing with one of said gear wheels fixed to one side of the indicating wheels and the other widthwisely half portion of said pinions having a reduced number of teeth intermittently engaging with each of said teeth portions provided fixedly to the other sides of the indicating wheels, a timer mechanism comprising a time setting wheel and a time setting disc, and an alarm mechanism comprising a buzzer, an improvement comprising a trifurcated control lever having first, second, and third arms and pivotally mounted on a structual part of the timekeeper to assume angular positions in a dropped state controllable in three steps, said first arm cooperating with a stopper capable of being advanced or retracted by said time setting mechanism, said second arm cooperating with a vibrator of said alarm mechanism, and said third arm cooperating with an electric switch of said timer mechanism, whereby the operation of said electric switch and said alarm mechanism can be controlled by said angular positions of said trifurcated control lever.

2. A timekeeper as defined in claim 1 wherein: when said trifurcated control lever is dropped to the upper position, the first arm of the lever is caused to be free from said stopper of the time setting mechanism, the second arm of said lever placing the electric switch in "ON" position, and the third arm of the lever locks said vibrator of the alarm mechanism; when said trifurcated control lever is dropped to the middle position, all of the arms are maintained in the same states except that the second arm places the electric switch in "OFF" position; and, when the same control lever is dropped to the lowest position, the first arm of the lever is normally maintained in engagement with the stopper of the time mechanism, and, upon arrival of the set time, the engagement of the first arm is released, lowering the control lever to another lower position, whereby the second arm places the electric switch in "ON" position, and the third arm releases the lock of vibrator to place the alarm mechanism in operable state.

3. A timekeeper provided with a timer and an alarm as defined in claim 1 wherein: a cam rotated by said timekeeping mechanism and a lever separate from said control lever are further provided; when said first lever is contacting the peripheral surface of said cam, said electric switch is placed in its operable state; and when said lever is contacting a cutout portion of said cam, said electric switch is placed in "OFF" state, said cam being also arranged to be rotatable from outside, whereby the timer mechanism is further made automatically operable after a desired time period from the instant when the imer has been once made operable.

References Cited

UNITED STATES PATENTS

| | | | |
|---|---|---|---|
| 2,026,070 | 12/1935 | Sholden | 58—21.15 X |
| 2,539,138 | 1/1951 | Johnson | 58—19 |
| 2,645,896 | 7/1953 | Uhlig et al. | 58—125 |
| 3,017,086 | 1/1962 | Harker et al. | 235—136 |
| 3,300,131 | 1/1967 | Juhas | 235—103 |
| 3,495,396 | 2/1970 | Funaki | 58—19 |

RICHARD B. WILKINSON, Primary Examiner

L. R. FRANKLIN, Assistant Examiner

U.S. Cl. X.R.

58—6, 21.15, 125 C; 235—136